Aug. 5, 1958   E. E. HUPP   2,845,904
FLUID PRESSURE SERVO-MOTOR
Filed May 3, 1956
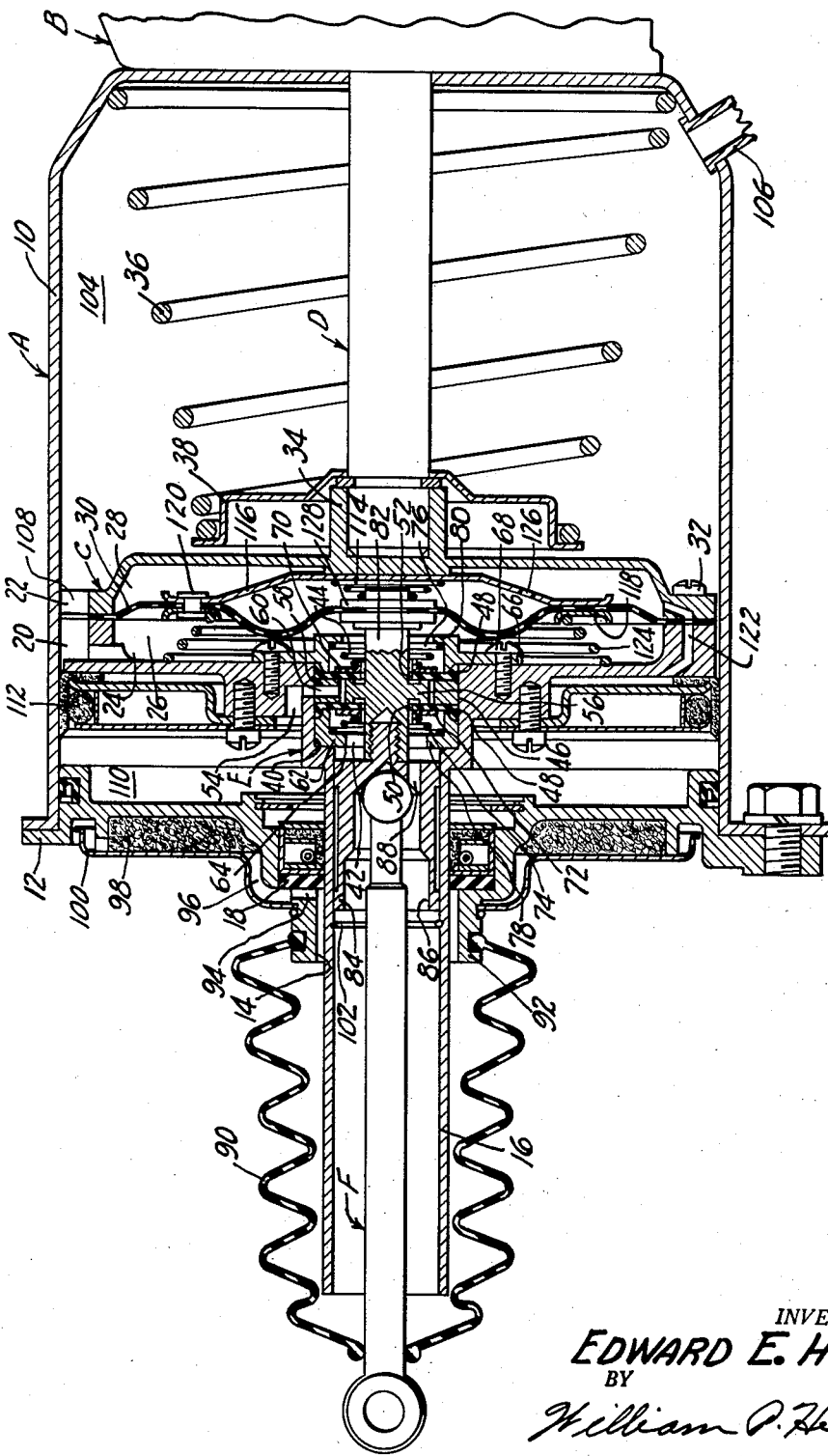
INVENTOR.
EDWARD E. HUPP
BY
William P. Hickey
ATTORNEY

United States Patent Office 2,845,904
Patented Aug. 5, 1958

2,845,904

FLUID PRESSURE SERVO-MOTOR

Edward E. Hupp, South Bend, Ind., assignor to Bendix Aviation Corporation, South Bend, Ind., a corporation of Delaware Application May 3, 1956, Serial No. 582,444

8 Claims. (Cl. 121—46.5)

The present invention relates to control valves generally, and more particularly to control valves for automotive brake applying servo-motors and the like.

An object of the present invention is the provision of a new and improved servo-motor having a control valve structure which is inexpensive to manufacture, rugged in construction, and efficient in its operation.

Another object of the invention is the provision of a new and improved control valve structure for a servo-motor and the like having a pair of spaced flexible diaphragm members with openings therethrough, and a valve closure member positioned between the diaphragm members for closing off said openings when centered therebetween—said structure being constructed such that movement of the closure member in one direction opens communication across one of the diaphragm members and movement of the control member in the other direction opens communication across the other of said diaphragm members.

Another object of the invention is the provision of a new and improved valve structure of the above described type and comprising a plurality of washer like elements stacked and confined within a counterbore of a valve body member.

The invention resides in certain constructions and combinations and arrangement of parts and further objects and advantages will be apparent to those skilled in the art to which the invention relates from the following description of the preferred embodiment described with reference to the accompanying drawing forming a part of this specification, and in which:

The single figure of the drawing is a longitudinal cross-sectional view of a pneumatic powered servo-motor of the type used for the actuation of automotive braking systems and embodying principles of the present invention.

The pneumatic powered servo-motor shown in the drawing generally comprises a cylinder body A to one end of which is attached a hydraulic pressurizing cylinder B of the type adapted to operate the brakes of an automotive vehicle. The cylinder body A contains a power piston C which is attached to one end of a fluid displacement member D of the hydraulic master cylinder B. Operation of the servo-motor is controlled by valve structure E mounted on the piston C and controlled by means of a foot pedal lever of the vehicle (not shown) through an interconnecting lever or push rod F. The hydraulic pressurizing cylinder B is of well known construction and will not further be described since it forms no part of the present invention. For details of such a pressurizing device, see the Earl R. Price et al. application 513,514.

The cylinder body A comprises a generally cup-shaped member 10 having a removable end closure plate 12 bolted in place and provided with a central opening 14 adapted to receive a tubular extension member 16 associated with piston C. The servo-motor shown in the drawing is a vacuum suspended unit in which vacuum is communicated to opposite sides of the piston, during periods of non-braking, and accordingly a suitable vacuum seal 18 is provided between the tubular extension member 16 and the closure plate 12.

The power piston C is formed in front and rear piston sections 20 and 22, respectively, to conveniently provide an internal piston or diaphragm chamber 24 which in turn is divided into front and rear opposed diaphragm chambers 26 and 28, respectively, by a flexible diaphragm 30—the outer edges of which are clamped between the piston sections 20 and 22 as by machine screws 32. The back side of the rear piston section 22 is provided with a rearwardly extending annular boss 34 adapted to receive the forward end of the fluid displacement member D. The piston assembly is urged into its normal forward position shown in the drawing by means of a coil spring 36 interpositioned between the closed end of the power cylinder A and an abutment plate 38 suitably affixed to the fluid displacement member D.

As previously indicated, operation of the unit is controlled by valve structure E mounted in power piston C and which is adapted to control the pressure differential across the piston. As shown in the drawing, the central opening of the tubular member 16 extends into the front opposed diaphragm chamber 26, and a counterbore 40 is provided adjacent the front diaphragm chamber 26 to receive the operative elements of the valve structure. The counterbore 40 is divided into a pair of spaced valve chambers 42 and 44, respectively, and an intermediate control chamber 46, by means of a pair of synthetic rubber diaphragm members 48 having centrally located openings 50 and 52, respectively. Control valve chamber 46 communicates with the front side of the piston by means of passageway 54; and atmospheric pressure and vacuum are communicated to the front and rear valve chambers 42 and 44, respectively, as will presently be described. Vacuum of substantially constant intensity is continually supplied to the back side of the power piston C, and actuation of the servo-motor is controlled by the regulation of atmospheric and vacuum flows to the front side of the power piston through the openings in the diaphragm members. Control of the atmospheric and vacuum flows through openings 50 and 52, respectively, is controlled by a single generally disc shaped valve closure member 56 positioned between the diaphragm members 48. The portions of the diaphragm members 48 surrounding their centrally located openings are capable of limited movement into the control chamber 46, and are biased into engagement with the generally disc shaped closure member 56 when the closure member is approximately centered within the control chamber. In this position, both the atmospheric and vacuum chambers 42 and 44 are isolated from the control chamber 46. Because the diaphragm members 48 are capable of limited movement into the control chamber, axial movement of the generally disc shaped closure member 56 in either axial direction causes the closure member to separate from the trailing diaphragm member to permit flow communication across the diaphragm, and to more firmly engage and seal with respect to the leading diaphragm.

In the preferred construction shown in the drawing, the diaphragm members 48 are spaced apart a suitable distance by means of an annular spacer member 58 having a generally radially extending passageway 60 communicating the inner and outer surfaces of the annular member 58 and adapted to be aligned with the piston passageway 54. The front diaphragm member 48 is adapted to abut an annular back-up ring 62 seated in the bottom of the counterbore 40 against shoulder 64, and an annular retaining plate 66 is provided to engage the rear diaphragm member 48 and confine the diaphragm assembly within the counterbore 40. Upon tightening machine screws 68 through the annular retainer plate 66, the front and rear diaphragm members 48 are sandwiched between the spacer member 58 and the back up ring and retaining plates 62 and 66, respectively, to provide a seal with respect to the side walls of the counterbore 40. The inner portions of diaphragm members 48 surrounding the openings 50 and 52, respectively, are stiffened by means of annular rings 70 and 72 which preferably overlap with the spacer member 58 to prevent the diaphragm members from moving past their vertical position into the control chamber 46. The valve closure disc 56 is slightly thicker than the spacer member 58 so as to be capable of abutment with both diaphragm members simultaneously when the disc is in its valve lapping position i. e. when centered between the diaphragm members. Spring 74 is positioned between the front diaphragm stiffening ring 72 and the flange 78, on the back-up ring 62, and spring 76 is positioned between the rear diaphragm stiffening ring 70 and flange 80 of the retaining plate 66 to assure sealing engagement of the diaphragm members with the disc 56 when abutted thereby. The generally disc shaped closure member 56 is formed integrally with a cylindrically shaped control member 82 extending through the openings 50 and 52 and having an enlarged portion which slidingly engages the side walls of tubular member 16. The forward end of the enlarged portion 84 is provided with a recess 86 adapted to receive the spherical end of the push rod F and a passageway 88 is provided to communicate atmospheric pressure through the tubular member 16 to the front atmospheric valve chamber 42. The tubular member 16 is encased within a rubber boot 90 attached to one end of the push rod F and at its other end to a forwardly extending boss 92 on the end closure plate 12; and atmospheric pressure is conducted to the boot and to the tubular member 16 through a passageway 94 in the boss. Passageway 94 opens into a filter chamber 96 containing filter material 98, and which chamber is formed between a cover plate 100 and the removable end closure plate 12.

The control valve structure E is shown in a lapped condition wherein both atmospheric and vacuum communication to the control chamber 46 is closed off. In the normal de-energized condition of the servo-motor, the control member 82 will be biased forwardly into engagement with a snap ring 102 positioned in the tubular member 16. In this position, the closure member 56 will be held in a forward position out of engagement with the rear diaphragm member 48 and deflecting the forward diaphragm member 48 forwardly of the position shown. In this normal position of the valve closure member 56, vacuum continually supplied to the rear powered chamber 104 by means of connection 106, travels through piston passageway 108 to the front diaphragm chamber 26 and thence through opening 52 and passageway 54 to the front power chamber 110 to provide the normal vacuum submerged condition of the servo-motor. Upon depressing of the foot pedal lever, not shown, of the automotive vehicle, the valve closure member 56 is moved rearwardly to engage the rear diaphragm member 48, thereby closing off vacuum communication between the front and rear power chambers 110 and 104, respectively. Continued rearward movement of the valve closure member 56 causes the valve closure member to more firmly engage the rear diaphragm member and effect a better seal therewith; and to at the same time separate from the front diaphragm member 48 thereby establishing atmospheric communication through opening 50 with the control chamber 46. Atmosphere is thereupon bled through passageway 54 to the front power chamber 110; and a suitable seal 112 is positioned between the piston C and the cup shaped member 10 to isolate the power chambers. Pressure built up in the front power chamber 110 causes the piston C to move rearwardly and the fluid displacement member D to actuate the brakes of the vehicle by displacing liquid from the hydraulic master cylinder B.

When the desired braking effect is achieved, rearward movement of the control member is stopped; whereupon, power piston C carries the forward diaphragm member 48 into engagement with the valve closure member 56 to close off further flow of atmospheric pressure to the forward power cylinder chamber 110. This produces a lapped condition of the valving similar to that shown in the drawing.

When it is desired to reduce the braking effort, retraction of the foot pedal lever permits coil spring 114 to move the valve closure member 56 into the previously described position, wherein it is moved out of engagement with the rear diaphragm member 48 permitting vacuum from the rear power chamber 104 to be communicated with front power chamber 110. Decrease in the differential pressure across power piston C permits coil spring 36, coupled with the reactive force of fluid displacement member D, to move the power piston C forwardly. Upon stopping of the forward movement of the control member 82, power piston C moves the rear diaphragm member 48 into engamement with the valve closure member 56 closing off further vacuum communication between the front and rear power chambers 110 and 104, respectively. Upon complete retraction of the foot pedal lever, the control member 82 will be forced into engagement with the snap ring 102 and the valve closure member 56 moves to the previously described forward position wherein vacuum communication exists between the front and rear power chambers 110 and 104, respectively, and the vacuum submerged condition is provided.

The servo-motor shown in the drawing is of a type adapted to provide a reactive force to the valve control member indicative of the force being delivered by the servo-motor. The device shown produces its reaction in two stages the first of which terminates at approximately the time that the vehicles brake shoes engage their brake drum. This is accomplished in the unit shown in the drawing by dividing the diaphragm 30 into two portions—the first of which comprises the inner or central portion of the diaphragm 30 and the second of which comprises the outer annular portion of the diaphragm 30. A cover plate 116 is provided on the rear side of the center portion of the diaphragm for reasons which will later be described, and the inner and outer portions of the diaphragm are separated by the attachment of the cover plate 116 to the diaphragm as by means of stiffening ring 118 and through-rivets 120. The center portion of the diaphragm 30 is provided with a rubber coated button 128 which abuts the valve control member 82, and a passageway 122 is provided in the piston C to communicate control pressure from the front power chamber 110 to the rear opposed diaphragm chamber 28.

As previously described, vacuum of the same intensity exists on both sides of the power piston C and the diaphragm 30 in the normal deenergized condition of the servo-motor. Initial valve actuating movement bleeds air pressure into the front power chamber 110 and thence through piston passageway 122 to the rear opposed diaphragm chamber 28 producing a pressure differential across the diaphragm 30 urging the diaphragm forwardly. The outer or secondary portion of the diaphragm, as well as cover plate 116, is biased rearwardly by a counter-reaction spring 124 to delay initial movement of the secondary portion of the diaphragm. Pressure bleed to the rear opposed diaphragm chamber 28 is throttled through an opening 126 in the cover plate 116 to gradually exert its force against the primary portion of the diaphragm, thereby, biasing the center portion forwardly to provide the initial or primary stage of the reaction previously described. At about the time that the vehicle's brake shoes engage their brake drums, sufficient pressure differential will be exerted across the diaphragm 30 to move the center plate 116 into engagement with the control member 82 and combine its reaction with that of the primary portion of the diaphragm.

From the foregoing description of the preferred embodiment of the invention, it will be apparent that the objects heretofore enumerated as well as others have been accomplished, and that there has been provided a new and improved control valve structure for servo-motors and the like which is inexpensive to manufacture, rugged in design, and efficient in its operation. While the diaphragm portions of the control valve structure have been described as being made from synthetic rubber and the like, other suitable materials may be utilized. Means other than metallic rings may be utilized to stiffen the diaphragm portions surrounding their centrally located openings, as for example, by molding flanged portions onto the diaphragms. Movement of the diaphragms into the valve control chamber may be limited by means other than the spacer member 58, and the center portions of the diaphragms may be biased inwardly by means other than the spring arrangement shown, as by means of spring action of the diaphragms themselves.

While the preferred embodiment has been shown and described in detail, the invention is not limited to the particular construction shown and described, and it is my intention to cover hereby all adaptations, modifications and uses thereof which come within the practice of those skilled in the art to which the invention relates.

I claim:

1. A control valve for servo-motors and the like comprising: a body member having a valve chamber therein; a pair of generally parallel movable walls having generally aligned openings therein and dividing said chamber into first and second spaced pressure chambers and a control chamber intermediate said movable walls; a movable valve closure member positioned between said movable walls in said control chamber for alternate abutment with the sides of said movable walls which face each other; said movable walls having portions surrounding said openings which are adapted to be biased toward and seat against said movable valve closure member, said movable wall portions having limited movement into said control chamber; and means operatively connected to said movable valve closure member for movement toward and away from said openings.

2. A control valve for servo-motors and the like comprising: a body member having a valve chamber therein; a pair of generally parallel diaphragm members having generally aligned openings therein and dividing said chamber into first and second spaced pressure chambers and a control chamber intermediate said diaphragm members; a movable valve closure member positioned between said diaphragm members in said control chamber for alternate abutment with the sides of said diaphragm members which face each other; said diaphragm members having portions surrounding said openings which are adapted to be biased toward and seat against said movable valve closure member, said diaphragm member portions having limited movement into said control chamber; and means operatively connected to said movable valve closure member for movement toward and away from said openings.

3. A control valve for servo-motors and the like comprising: a body member having a valve chamber therein; a pair of generally parallel diaphragm members having generally aligned openings therein and dividing said chamber into first and second spaced pressure chambers and a control chamber intermediate said diaphragm members; a movable valve closure member positioned between said diaphragm members in said control chamber for simultaneous abutment with the sides of said diaphragm members which face each other; means causing the portions of said diaphragm members surrounding said openings to be urged toward engagement with said movable valve closure member when it is approximately centered therebtween, said diaphragm member portions having limited movement into said control chamber; and means operatively connected to said movable valve closure member for movement toward and away from said openings.

4. A control valve for servo-motors and the like comprising: a body member having a valve chamber therein; a pair of generally parallel diaphragm members having generally aligned openings therein and dividing said chamber into first and second spaced pressure chambers and a control chamber intermediate said diaphragm members; a movable valve closure member positioned between said diaphragm members in said control chamber for simultaneous abutment with the sides of said diaphragm members which face each other and adapted to close off said openings, said closure member having an actuating portion extending through one of the openings in said diaphragm members, said diaphragm members having portions surrounding said openings which are biased inwardly into engagement with said movable valve closure member when approximately centered therebetween; and said diaphragm members having limited movement into said control chamber to permit separation of the closure member from the diaphragm members.

5. A control valve for servo-motors and the like comprising: a body member having a valve chamber therein; a pair of generally parallel diaphragm members having generally aligned openings therein and dividing said chamber into first and second spaced pressure chambers and a control chamber intermediate said diaphragm members; a generally annular spacer member between said diaphragm members and having at least one generally radially extending opening therethrough for conducting control pressures to appropriate portions of the servo-motor; a movable valve closure member having a generally disk shaped portion positioned between said diaphragm members radially inwardly of said spacer member and adapted to close off said openings, said closure member having an actuating portion extending through one of the openings in said diaphragm members; said diaphragm members having portions surrounding said openings which are simultaneously biased inwardly into engagement with said disk shaped portion of said movable valve closure member when it is approximately centered therebetween; and said diaphragm members having limited movement into said control chamber to permit separation of the closure member from the diaphragm members.

6. A control valve for servo-motors and the like comprising: a body member having a valve chamber therein; an axially extending pair of generally parallel diaphragm members having generally axially aligned openings therein and dividing said chamber into first and second spaced pressure chambers and a control chamber intermediate said diaphragm members; a generally annular spacer member between said diaphragm members and having at least one generally radially extending opening therethrough for conducting control pressures to appropriate portions of the servo-motor; a movable valve closure member having a generally disk shaped portion positioned between said diaphragm members radially inwardly of said spacer member and adapted to close off said openings, said disk shaped portion having an axially extending dimension slightly greater than that of said spacer member and said closure member having an actuating portion extending through one of the openings in said diaphragm members, said diaphragm members having stiffened portions surrounding said openings, and said portions having limited movement into said control chamber; and spring means biasing said stiffened portions inwardly into engagement with said valve closure member when said disk shaped portion of said valve closure member is approximately centered in said control chamber.

7. In a control valve: a body member having a valve chamber counterbored to provide an internal shoulder; an annular back-up ring positioned in said counterbore against said shoulder; a first diaphragm with an opening therein positioned against said back-up ring; a generally annular spacer member positioned in said counterbore against said diaphragm and having at least one generally radially extending opening therethrough for conducting control pressure out of said valve; a second diaphragm with an opening therein positioned against said spacer member; a generally annular retainer member fastened to said body member and confining said back-up ring, said diaphragms and spacer member between itself and said shoulder; a movable valve closure member positioned between said diaphragm members radially inwardly of said spacer member and adapted to close off said openings, said closure member having an actuating portion extending through one of the openings in said diaphragm members, and the portions of said diaphragms surrounding said openings being adapted for limited movement into the space between said diaphragms, whereby movement of the closure member longitudinally of said counterbore in one direction separates the closure member from one of the diaphragms, and movement of the closure member in the other direction separates the closure member from the other of said diaphragms.

8. In a control valve: a body member having a valve chamber counterbored to provide an internal shoulder; an annular back-up ring positioned in said counterbore against said shoulder; a first diaphragm with an opening therein positioned against said back-up ring; a generally annular spacer member positioned in said counterbore against said diaphragm and having at least one generally radially extending opening therethrough for conducting control pressure out of said valve; a second diaphragm with an opening therein positioned against said spacer member; a generally annular retainer member fastened to said body member and confining said back-up ring, said diaphragms and spacer member between itself and said shoulder; a movable valve closure member positioned between said diaphragm members radially inwardly of said spacer member and adapted to close off said openings, said closure member having an actuating portion extending through one of the openings in said diaphragm members; and spring means biasing the portions of said diaphragms surrounding said openings inwardly into engagement with said closure member when said movable closure member is approximately centered therebetween, and whereby movement of the closure member longitudinally of said counterbore in one direction separates the closure member from one of the diaphragms, and movement of the closure member in the other direction separates the closure member from the other of said diaphragms.

References Cited in the file of this patent

UNITED STATES PATENTS

| | | |
|---|---|---|
| 2,086,868 | Hall | July 13, 1937 |
| 2,432,721 | Brown | Dec. 16, 1947 |
| 2,735,268 | Stelzer | Feb. 21, 1956 |